(12) United States Patent
Williams et al.

(10) Patent No.: US 9,378,738 B2
(45) Date of Patent: *Jun. 28, 2016

(54) SYSTEM AND METHOD FOR ADVANCED TURN-TAKING FOR INTERACTIVE SPOKEN DIALOG SYSTEMS

(71) Applicant: AT&T Intellectual Property I, L.P., Atlanta, GA (US)

(72) Inventors: Jason D. Williams, Seattle, WA (US); Ethan Selfridge, Portland, OR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,516

(22) Filed: Dec. 10, 2014

(65) Prior Publication Data

US 2015/0100316 A1    Apr. 9, 2015

Related U.S. Application Data

(63) Continuation of application No. 13/224,027, filed on Sep. 1, 2011, now Pat. No. 8,914,288.

(51) Int. Cl.
| | |
|---|---|
| *G10L 15/05* | (2013.01) |
| *G10L 15/22* | (2006.01) |
| *G10L 15/04* | (2013.01) |
| *G10L 15/06* | (2013.01) |
| *G10L 15/08* | (2006.01) |

(52) U.S. Cl.
CPC ............... *G10L 15/222* (2013.01); *G10L 15/04* (2013.01); *G10L 15/05* (2013.01); *G10L 15/063* (2013.01); *G10L 15/083* (2013.01)

(58) Field of Classification Search
USPC .................................................. 704/231–257
See application file for complete search history.

(56) References Cited

U.S. PATENT DOCUMENTS

| | | |
|---|---|---|
| 4,882,757 A | 11/1989 | Fisher et al. |
| 5,086,472 A | 2/1992 | Yoshida |
| 5,526,463 A | 6/1996 | Gillick et al. |

(Continued)

OTHER PUBLICATIONS

Aist et al., "Incremental understanding in human-computer dialogue and experimental evidence for advantages over nonincremental methods", Decalog 2007: Proceedings of the 11th Workshop on the Semantics and Pragmatics of Dialogue, pp. 149-154, Trento, Italy, May 30-Jun. 1, 2007.

(Continued)

*Primary Examiner* — Abul Azad

(57) ABSTRACT

Disclosed herein are systems, methods, and non-transitory computer-readable storage media for advanced turn-taking in an interactive spoken dialog system. A system configured according to this disclosure can incrementally process speech prior to completion of the speech utterance, and can communicate partial speech recognition results upon finding particular conditions. A first condition which, if found, allows the system to communicate partial speech recognition results, is that the most recent word found in the partial results is statistically likely to be the termination of the utterance, also known as a terminal node. A second condition is the determination that all search paths within a speech lattice converge to a common node, also known as a pinch node, before branching out again. Upon finding either condition, the system can communicate the partial speech recognition results. Stability and correctness probabilities can also determine which partial results are communicated.

20 Claims, 4 Drawing Sheets

(56) References Cited

U.S. PATENT DOCUMENTS

| | | |
|---|---|---|
| 5,956,675 A | 9/1999 | Setlur et al. |
| 6,604,077 B2 | 8/2003 | Dragosh et al. |
| 7,107,207 B2 | 9/2006 | Goodman |
| 7,149,687 B1 | 12/2006 | Gorin et al. |
| 7,562,010 B1 | 7/2009 | Gretter et al. |
| 7,571,098 B1 | 8/2009 | Gorin et al. |
| 7,603,272 B1 | 10/2009 | Hakkani-Tur et al. |
| 7,881,935 B2 | 2/2011 | Asano et al. |
| 7,957,971 B2 | 6/2011 | Gorin et al. |
| 2001/0041978 A1 | 11/2001 | Crespo et al. |
| 2004/0148163 A1 | 7/2004 | Baker et al. |
| 2007/0143110 A1 | 6/2007 | Acero et al. |

OTHER PUBLICATIONS

Schlangen et al., "A General, Abstract Model of Incremental Dialogue Processing", Proceedings of the 12th Conference of the European Chapter of the Association for Computational Linguistics, pp. 710-718, Athens, Greece, Mar. 30-Apr. 3, 2009.

Williams et al., "Estimating probability of correctness for ASR N-Best lists", Proceedings of SIGDIAL 2009: The 10th Annual Meeting of the Special Interest Group in Discourse and Dialogue, pp. 132-135, Queen Mary University of London, Sep. 2009.

SYSTEM AND METHOD FOR ADVANCED TURN-TAKING FOR INTERACTIVE SPOKEN DIALOG SYSTEMS

PRIORITY INFORMATION

The present application is a continuation of U.S. patent application Ser. No. 13/224,027, filed Sep. 1, 2011, the contents of which is incorporated herein by reference in its entirety.

BACKGROUND

1. Technical Field

The present disclosure relates to incremental speech recognition and more specifically to returning intermediate results from speech recognition while preparing a speech response.

2. Introduction

Spoken dialog systems often work in a turn-based configuration. In a turn-based configuration the user and the system take turns communicating with one another. For example, the system starts playing a prompt and stops when the prompt finishes or user speech is detected. The system waits for a reply or waits until the user stops speaking. If the user spoke, the system analyzes this speech and prepares a response. If no speech was detected from the user, the system can repeat the prompt, respond with a new prompt, or continue waiting.

A "barge-in" refers to when the user begins speaking prior to a prompt's completion. A barge-in can be problematic for many speech dialog systems because the system automatically starts and stops upon detection of user speech, without regard for what the user has said. This in turn results in false barge-ins, where the system stops a prompt when it should continue, and barge-in stutter, where the system and the user start talking at the same time, then both stop.

To solve the barge-in and related problems, one proposal is incremental speech processing. With incremental speech processing, the spoken dialog system continuously runs speech recognition and makes turn-taking decisions using the sequence of partial speech recognition results available while the user is speaking. One problem associated with incremental speech processing is that the partial speech recognition results are inherently unstable. Constant changes and revisions created as the system receives more speech result in expanding, shifting, and often spurious partial results. Waiting for more speech to arrive before producing partial results can, in some instances, add stability. Unfortunately, this action also produces latency, compromising the effectiveness of incremental processing.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for advanced turn-taking in interactive spoken dialog systems. A system configured according to this disclosure can incrementally process speech prior to completion of the speech utterance, and can communicate partial speech recognition results upon finding particular conditions. The system determines if these conditions exist using a speech recognition module, configured to recognize the conditions based on properties of the incremental speech recognition results. A first condition which, if found, allows the system to communicate partial speech recognition results, is that the most recent word found in the partial results is statistically likely to be the termination of the utterance, also known as a terminal node. A second condition is the determination that all search paths within a speech lattice converge to a common node, also known as a pinch node, before branching out again.

Upon finding either condition, the system can communicate the partial speech recognition results. In certain embodiments this communication can go to another system, which in turn prepares a response based on the partial speech recognition results. In other embodiments the communication can go to another module or processing area of the system to prepare a response to the speech. In either embodiment, processing the partial speech recognition results before the user completes the utterance allows the system to avoid latency and more accurately predict when the system should respond to a user utterance, when the system should continue analyzing speech, when the system should interrupt a user, or when the system should prompt the user for additional information, thereby enhancing turn-taking in interactive spoken dialog systems.

Another aspect of the disclosed systems, methods, and non-transitory computer-readable storage media concerns the stability and correctness of the partial speech recognition results. A partial speech recognition result is stable if it is a prefix of the final result, and a partial speech recognition result is correct if it is a prefix of the actual user's speech. To improve stability and correctness determinations, a corpus of in-domain utterances is first collected. Then recognition is run on the corpus, so that for each utterance there is a sequence of partial results, finishing with the final result. Each partial result also contains all recognition features available, such as path costs, lattice structure, type of partial result (terminal node or pinch node), etc. Each partial result is labeled as "stable" if it is a prefix of the final result, or "unstable" if it is not. Finally, a machine learning algorithm is used to predict whether the partial results will be stable, as determined from the recognition features. A similar machine learning algorithm is used to predict whether the partial results will be correct, using the same recognition features.

Having run the recognition on the corpus, the results are applied to a speech recognition model for use with future utterances. As the modified speech recognition model processes speech, it searches for pinch and terminal nodes while evaluating the stability and correctness of each path. When sufficiently stable and sufficiently correct nodes, determined by the system to be pinch nodes or terminal nodes, are found within the speech recognition module, the partial speech recognition results can then be communicated to a response preparation module.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for advanced turn-taking for interactive spoken dialog systems. A system, method and non-transitory computer-readable media are disclosed which advance turn-taking for interactive spoken dialog systems. A brief introductory description of a basic general purpose system or computing device in FIG. 1 which can be employed to practice the concepts is disclosed herein. A more detailed description of advanced turn-taking will then follow, with variations and embodiments set forth. The disclosure now turns to FIG. 1.

Figure 1:
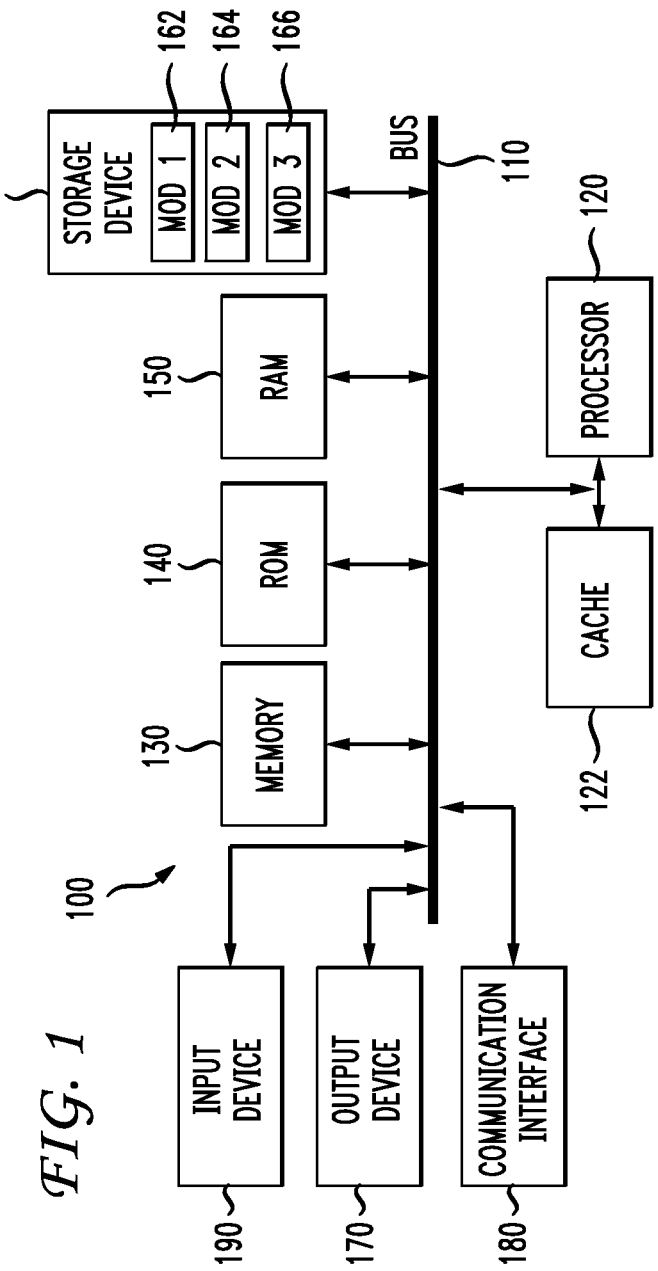
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
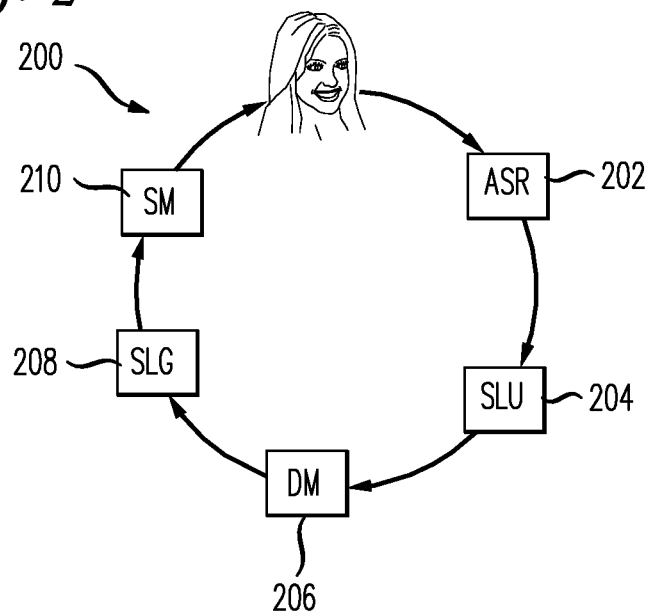
FIG. 2 illustrates a functional block diagram that illustrates an exemplary natural language spoken dialog system.

Having disclosed some components of a computing system, the disclosure now turns to FIG. 2, which illustrates an exemplary natural language spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The automatic speech recognition module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training automatic speech recognition module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
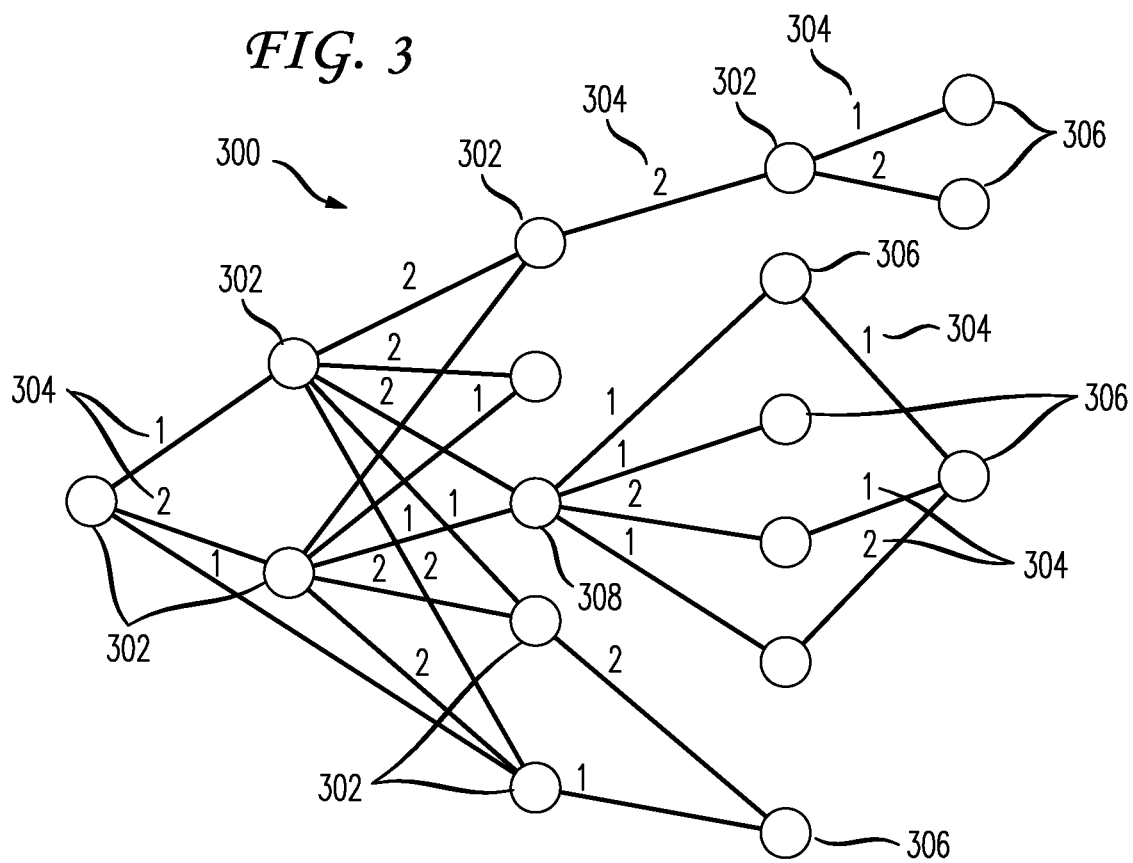
FIG. 3 illustrates an exemplary speech lattice.

FIG. 3 illustrates an exemplary speech lattice 300. This example lattice illustrates one way in which speech recognition systems determine words, sentences, and utterances within a spoken dialog system. In a word recognition lattice, each arc 304 can represent phonemes with probabilities, while in a sentence recognition lattice each arc 304 can represent words with probabilities. In this illustration, which applies equally to phonemes and words, those probabilities are numbered with a '1' or a '2'. In other embodiments the numbered probabilities can be represented with percentages, fractions, integers, or any other means for denoting statistical probability. Each node 302 with an arc 304 extending from it indicates a branch-point in the search. Depending on the particular probabilities of correctness and stability, these intermediary nodes 302 from which arcs 304 extend can become pinch nodes. Nodes where the probabilities indicate that the user's speech is likely to end are called terminal nodes. Terminal nodes may be at the rightmost frontier of the lattice 306, or may be intermediary nodes 302, depending on the form of the models being used for recognition, and the probabilities associated with stability, correctness, and arc extensions.

For example, if a spoken dialog system were using an incremental speech recognition module configured according to this disclosure to recognize a sentence spoken by a user, each arc 304 would represent a possible word that the user will speak next. While there exist thousands of possible words that could come next, the probability of most of those possibilities is quite small. In instances where the sentence is likely to end at the last word discovered, a terminal node is found. Therefore, even if it is possible that the sentence will continue, if the probability indicates that the sentence is over, a terminal node is noted and the partial results, made up in part by the highest probable arcs leading to that terminal node, are communicated forward.

Discovering a pinch node can operate in similar manner. If all lattice arcs 304 converge to a single node 302, such that any path from the start node to any node in the right-most frontier of the lattice passes through that single node, that single node can be identified as a pinch node. At that point the partial results of the spoken dialog system can be communicated forward. Node 308 is an example of a pinch node. Upon determining that the pinch node 308 is contained within the speech, the partial results prior to the pinch node 308 are communicated.

Figure 4:
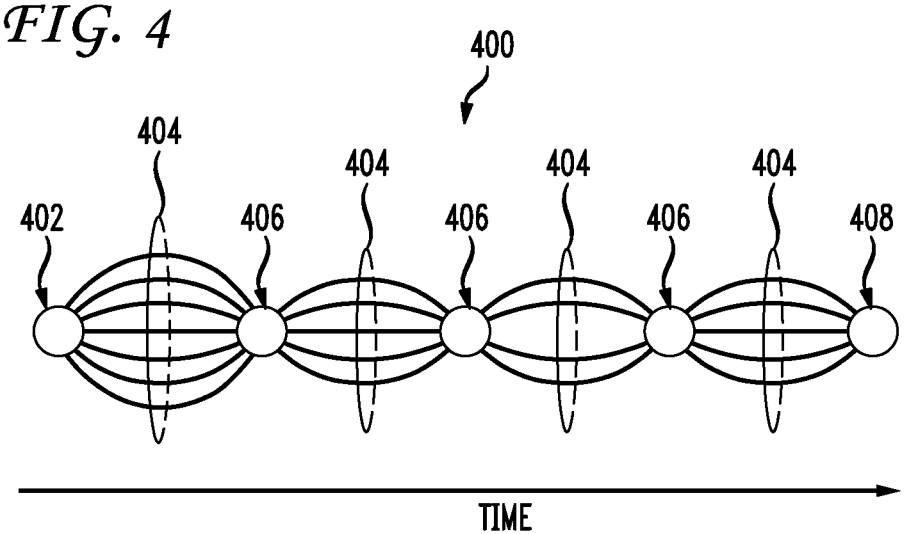
FIG. 4 illustrates an example of speech probability containing pinch and terminal nodes.

FIG. 4 illustrates an example of speech probability 400 within an incremental speech recognition module, containing pinch and terminal nodes. In this example, a starting point 402 is identified, after which many arcs as described in FIG. 3 are bundled together 404, representing possible phonemes or words within the speech being analyzed. Despite their differences, all of the arcs within this bundle 404 pass through a common point, or node 406, 408. Where this occurs, the node 406 can be noted as a pinch node, whether or not additional words or phonemes are likely to occur past it. Where the common node is likely to terminate the word or sentence being recognized, whether at a node on the right-most frontier 408 or an intermediate node 406, the common node can be noted as a terminal node.

Figure 5:
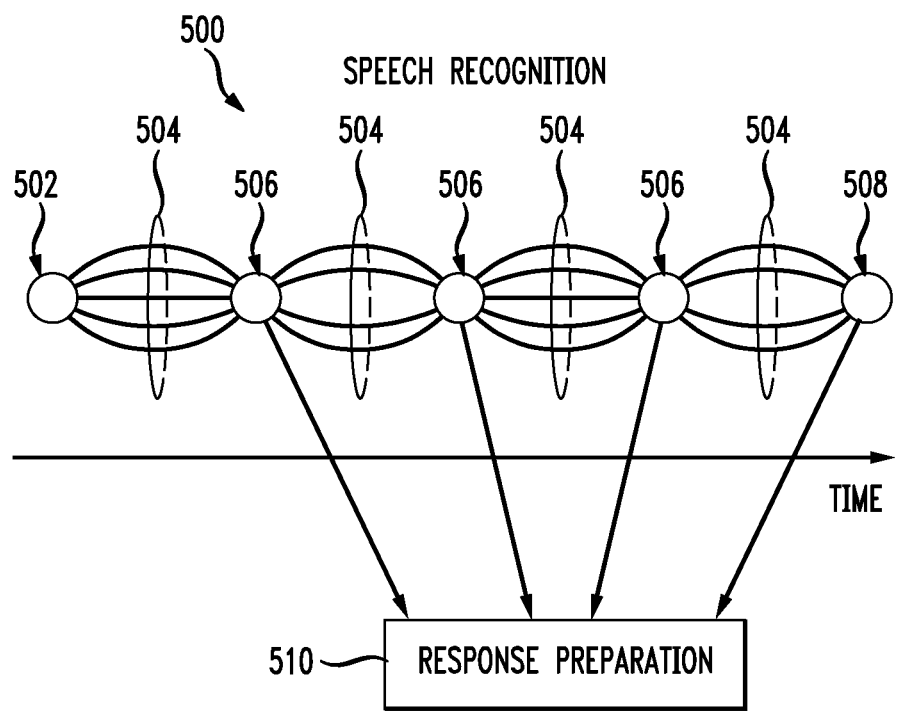
FIG. 5 illustrates partial speech recognition results being forwarded for response preparation.

FIG. 5 illustrates an exemplary lattice 500 within an incremental speech recognition module, where the results are being communicated to a response preparation module 510. Once a starting point for the incremental speech recognition module begins, upon calculating that the recognized speech possibilities 504 converge to a single point 506 a pinch node 506 or a terminal node 506 or 508 is noted. Upon noting a pinch node or the terminal node, the system communicates partial speech recognition results obtained to a response preparation module 510. The actual information communicated can be the most probable path of partially recognized speech through the word or sentence lattice, or it can be multiple paths depending upon the particular embodiment. In one embodiment the amount of information communicated can be all of the previously obtained partial speech from the start of the utterance to the currently found pinch or terminal node, whereas in another embodiment the amount of information communicated is only the partial speech results obtained after the previous communication.

Figure 6:
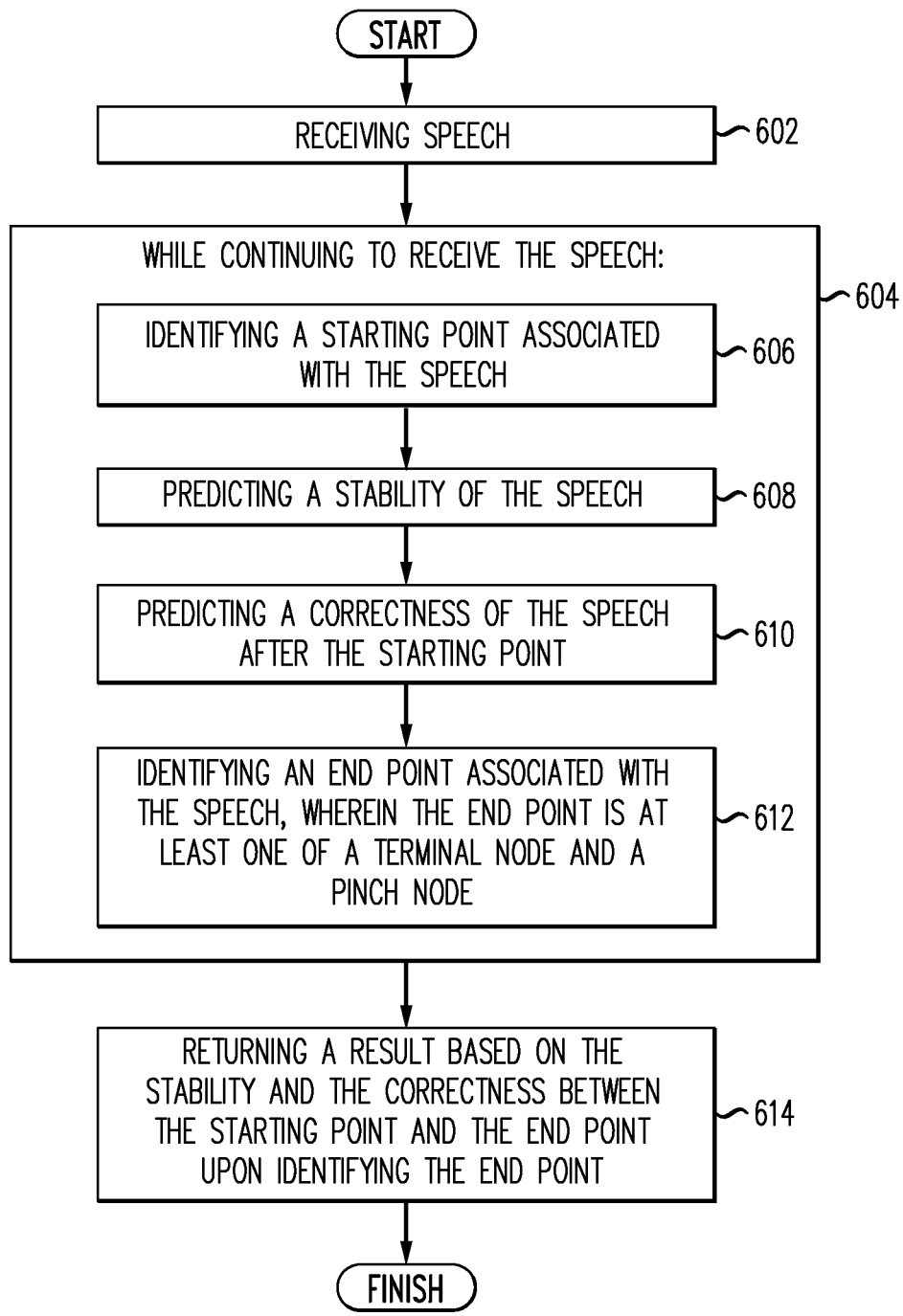
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives speech (602). In one embodiment, this speech can be received directly from a user, whereas in another embodiment the speech can be received from a storage device or another system. Upon receiving the speech, and while continuing to receive the speech, the system 100 begins an analysis of the speech (604). This analysis (604) includes identifying a starting point (606), predicting the stability of the speech (608), predicting the correctness of the speech (610), and identifying an end point, wherein the end point is at least one of a terminal node and a pinch node (612). The system 100 then returns a result based on the stability and correctness between the starting point and the end point upon identifying the end point (614).

For example, if the system 100 is being used to identify speech in the sentence "I want to check my balance," the system 100 immediately and incrementally begins speech recognition. As the system 100 receives each phoneme within the utterance, in addition to normal speech recognition processes, the system 100 determines probabilities for the stability, correctness, and convergence of the partial speech results obtained. In this example, the system 100 determines all probability paths converge at a point following the first word, which is most likely "I". The system 100 identifies this point as a pinch node, and communicates the most likely partial results obtained to this point, "I". The system 100 continues to perform recognition on the speech as the utterance is received.

As the speaker is halfway through the pronunciation of the word "want", the system 100 can analyze the probabilities, the stability, correctness, and convergence. Most embodiments will determine that no pinch node or terminal node has been found, and will continue to process the speech searching for those conditions before sending the partial results. Once the final phonemes are received, "want" is recognized as stable, correct, and a pinch node, and communicated forward. With "to" the system 100 is likely to wait, because multiple probable words could recognized: "to", "too", or "two". The system 100 waits until the next word is recognized, "check". At this point, the system 100 has the partial sentence "I want to check" or "I want two check". "I want to check" has higher stability, meaning it is more likely to be a prefix of the final result than "I want two check" because "I want two check" alone does not align with English grammatical rules, but depending on the speaker, "I want two check" could have greater correctness. Because there is no consensus on stability or correctness, no partial results are communicated. Upon recognizing the next word "my" the stability and correctness both favor "I want to check my" rather than "I want two check my". A pinch node is therefore marked, and the partial results are communicated. Upon recognizing balance, a terminal node is identified, and the partial results to that point are communicated. Throughout this example, the communicated partial results can be the portion of the recognized speech from the previous node, or the entirety of the recognized speech found to that point. For example, one embodiment communicates "I", followed shortly after by "want". Another embodiment communicates "I", followed shortly by "I want".

A system configured in this manner performs incremental speech recognition, but can only return results upon finding particular conditions, namely a pinch or terminal node, and a path to that node sufficiently stable and correct. Incremental speech recognition, or recognizing speech prior to completion of an utterance, can then provide accurate results without increasing latency. To determine if a path to a node is sufficiently stable and correct, the speech recognition model contains probabilities for both stability and correctness, in addition to phoneme or word probabilities and other essential components of a speech recognition model. In one embodiment, these probabilities are added into the speech recognition model prior to usage by the current system 100 employing those probabilities into the analysis. In another embodiment, the stability and correctness probabilities are added to the lattice by modification after performing speech recognition.

In an embodiment where the speech and correctness probabilities are added into the lattice after performing speech recognition, the system 100 first obtains a corpus of previous in-domain utterances. The system 100 performs recognition on the corpus, so that for each utterance there is a sequence of partial results, finishing with the final result. Each partial result also contains all recognition features available, such as path costs, lattice structure, type of partial result (terminal node or pinch node), etc. These previous partial results are used to establish new probabilities for both stability and correctness. Each partial result is labeled as "stable" if it is a prefix of the final result, or "unstable" if it is not a prefix of the final result of its associated utterance. Similarly, each partial result is labeled as "correct" if it was a prefix of the actual user utterance, and "incorrect" if it was not. All utterances contained in the corpus, the associated recognition features of those utterances, and the stability/correctness labels are compiled together and analyzed. The analysis can be a machine learning algorithm or any other means to determine probability for when a partial result will be stable and when a partial result will be correct. In one embodiment, the machine learning algorithm used is a logistic regression analysis, which is both fast and provides scores corresponding to real probabilities.

When the system 100 performs incremental speech recognition using this analysis (604), the system 100 no longer need consider every partial result possible. Because of the stability and correctness probabilities, combined with standard word or phoneme selection probabilities associated with a speech recognition system, the number of partial results the system 100 must manage is greatly reduced, and increased accuracy can be found in the communicated partial results.

In certain embodiments, the use of stability and correctness probabilities can be disregarded, and the system 100 will only search for the pinch or terminal node conditions. In other embodiments, the system 100 can only search for stability probabilities within the partial results, disregarding the correctness probability. In yet other embodiments, the system 100 can only search for correctness probabilities within the partial results, disregarding the stability probability. In an embodiment where one or more of the stability/correctness probabilities is disregarded, the system 100 can receive a speech model with those probabilities included, after which the system 100 ignores the probabilities. Alternatively, such an embodiment can receive or use a speech model without stability or correctness probabilities.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein pertain generally to turn-taking for interactive spoken dialog systems, and are not constrained to a particular device or mechanism. Those skilled in the art will readily recognize various modifications and changes that may be made to the principles described herein without following the example embodiments and applications illustrated and described herein, and without departing from the spirit and scope of the disclosure.

We claim:

1. A method for determining turn order between a user and an interactive turn-taking spoken dialog system based on a result, the method comprising:
   receiving speech; and
   while continuing to receive the speech:
   identifying a starting point associated with the speech;
   identifying content of the speech received so far, to yield identified content;
   predicting a stability of the identified content; and
   identifying an end point associated with the speech, wherein the end point is a pinch node in a content lattice; and
   returning, via a processor, a result based on the stability between the starting point and the end point.

2. The method of claim 1, wherein the starting point is one of a beginning of the speech and a previously marked pinch node.

3. The method of claim 1, wherein the stability of the identified content of the identified content is determined using stability probability.

4. The method of claim 3, wherein the stability probability is determined using a machine learning algorithm on a corpus of speech utterances.

5. The method of claim 4, wherein the machine learning algorithm is a logistic regression.

6. The method of claim 1, wherein the result comprises a path having a highest probability through a speech component lattice.

7. The method of claim 1, wherein the result comprises partial speech recognition.

8. A system for determining turn order between a user and an interactive turn-taking spoken dialog system based on a result, the system comprising:
   a processor; and
   a computer-readable storage medium having instructions stored which, when executed by the processor, cause the processor to perform operations comprising:
   receiving speech; and
   while continuing to receive the speech:
   identifying a starting point associated with the speech;
   identifying content of the speech received so far, to yield identified content;
   predicting a stability of the identified content; and
   identifying an end point associated with the speech, wherein the end point is a pinch node in a content lattice; and
   returning, a result based on the stability between the starting point and the end point.

9. The system of claim 8, wherein the starting point is one of a beginning of the speech and a previously marked pinch node.

10. The system of claim 8, wherein the stability of the identified content of the identified content is determined using stability probability.

11. The system of claim 10, wherein the stability probability is determined using a machine learning algorithm on a corpus of speech utterances.

12. The system of claim 11, wherein the machine learning algorithm is a logistic regression.

13. The system of claim 8, wherein the result comprises a path having a highest probability through a speech component lattice.

14. The system of claim 8, wherein the result comprises partial speech recognition.

15. A computer-readable storage device having instructions stored which, when executed by a computing device, cause the computing device to perform operations comprising:
   receiving speech; and
   while continuing to receive the speech:
      identifying a starting point associated with the speech;
      identifying content of the speech received so far, to yield identified content;
      predicting a stability of the identified content; and
      identifying an end point associated with the speech, wherein the end point is a pinch node in a content lattice; and
   returning a result based on the stability between the starting point and the end point.

16. The computer-readable storage device of claim 15, wherein the starting point is one of a beginning of the speech and a previously marked pinch node.

17. The computer-readable storage device of claim 15, wherein the stability of the identified content of the identified content is determined using stability probability.

18. The computer-readable storage device of claim 17, wherein the stability probability is determined using a machine learning algorithm on a corpus of speech utterances.

19. The computer-readable storage device of claim 18, wherein the machine learning algorithm is a logistic regression.

20. The computer-readable storage device of claim 15, wherein the result comprises a path having a highest probability through a speech component lattice.

* * * * *